United States Patent
Ezer et al.

(10) Patent No.: US 10,753,784 B2
(45) Date of Patent: Aug. 25, 2020

(54) FLUID-FILLED PERSONAL SCALE RESPONSIVE TO TEMPERATURE AND PRESSURE

(71) Applicant: Agora Wellness Technologies, Tzur Moshe (IL)

(72) Inventors: Nir Ezer, Givatayim (IL); Efi Levinzon, Tzur Moshe (IL)

(73) Assignee: AGORA WELLNESS TECHNOLOGIES, Tzur Moshe (IL)

( * ) Notice: Subject to any disclaimer, the term of this patent is extended or adjusted under 35 U.S.C. 154(b) by 236 days.

(21) Appl. No.: 15/818,047

(22) Filed: Nov. 20, 2017

(65) Prior Publication Data

US 2018/0335334 A1    Nov. 22, 2018

Related U.S. Application Data

(60) Provisional application No. 62/506,824, filed on May 16, 2017.

(51) Int. Cl.

| | |
|---|---|
| *G01G 5/06* | (2006.01) |
| *G01G 23/48* | (2006.01) |
| *G01G 19/50* | (2006.01) |
| *G01G 19/44* | (2006.01) |
| *G01G 23/37* | (2006.01) |

(52) U.S. Cl.
CPC ............... *G01G 5/06* (2013.01); *G01G 19/50* (2013.01); *G01G 23/48* (2013.01); *G01G 19/44* (2013.01); *G01G 23/3735* (2013.01)

(58) Field of Classification Search
CPC .......... G01G 5/006; G01G 5/06; G01G 19/44; G01G 19/50; G01G 23/48; G01G 23/3735
See application file for complete search history.

(56) References Cited

U.S. PATENT DOCUMENTS

| | | | | |
|---|---|---|---|---|
| 5,234,065 A | * | 8/1993 | Schmidt ................. | G01G 5/04 177/126 |
| 5,606,516 A | * | 2/1997 | Douglas ................. | G01G 5/003 177/208 |
| 5,987,370 A | * | 11/1999 | Murphy ................. | B60N 2/002 701/45 |
| 6,058,341 A | * | 5/2000 | Myers ................... | B60N 2/002 701/45 |
| 6,076,853 A | * | 6/2000 | Stanley ................. | B60N 2/002 177/208 |

(Continued)

*Primary Examiner* — Randy W Gibson
(74) *Attorney, Agent, or Firm* — M&B IP Analysts, LLC

(57) ABSTRACT

A system and method for measuring the weight of a user using an scale, the scale having an inflatable pouch with a fluid pressure sensor and a temperature sensor placed therein; a processing circuitry connected to the fluid pressure sensor and the temperature sensor; a communication interface connected to the processing circuitry; wherein the fluid pressure sensor is configured to determine an internal pressure from the fluid pressure sensor, and the temperature sensor is configured to determine an internal temperature within the inflatable pouch; wherein the processing circuitry is configured to calculate a weight of an object placed on the inflatable pouch based on the determined internal pressure and internal temperature; and wherein the processing circuitry is configured to relay the calculated weight of the object to a user device via the communication interface.

7 Claims, 6 Drawing Sheets

(56) References Cited

U.S. PATENT DOCUMENTS

| | | | | |
|---|---|---|---|---|
| 6,101,436 A | * | 8/2000 | Fortune | B60N 2/002 701/45 |
| 6,138,067 A | * | 10/2000 | Cobb | B60N 2/002 701/45 |
| 6,490,936 B1 | * | 12/2002 | Fortune | B60N 2/002 73/862.581 |
| 6,781,067 B2 | * | 8/2004 | Montagnino | G01G 19/44 177/142 |
| 7,047,827 B1 | * | 5/2006 | Mithal | G01G 5/04 73/862.581 |
| 8,330,058 B2 | | 12/2012 | Mekid | |
| 2010/0300768 A1 | | 12/2010 | Reiter | |
| 2012/0104812 A1 | * | 5/2012 | Griffin | B60N 2/002 297/217.1 |
| 2016/0187181 A1 | * | 6/2016 | Gupta | G01G 3/125 177/177 |

* cited by examiner

FLUID-FILLED PERSONAL SCALE RESPONSIVE TO TEMPERATURE AND PRESSURE

CROSS-REFERENCE TO RELATED APPLICATIONS

This application claims the benefit of U.S. Provisional Application No. 62/506,824 filed on May 16, 2017, the contents of which are hereby incorporated by reference.

TECHNICAL FIELD

The present disclosure relates generally to scales, and more specifically to pressure and temperature based scales where the weight of an object is determined based on internal pressure and temperature measurements within a pouch.

BACKGROUND

Measuring and keeping track of an individual's body weight can be part of a healthy lifestyle, as well as be necessary for various medical reasons, such as monitoring weight gain or loss for a recovering patient. Traditional scales include a rigid object, often in a rectangular of square shape, that relies on springs and gears to measure the distance the spring deforms under a load, which can then be displayed at a calculated weight. More modern scales use strain gauges or piezo-electric crystals, e.g., where a mechanical stress or deformation produces a change in electrical resistance or charge, to measure weight.

However, these scales are often bulky and cannot be easily transported in a compact manner. Additionally, it can be difficult to track and analyze a user's weight over a period of time while comparing weight values to the user's earlier measurements or to other individuals, such as within an online community, in an automated fashion, which may be particularly desirable for motivational reasons.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "an embodiment" may be used herein to refer to a single embodiment or multiple embodiments of the disclosure.

Certain embodiments disclosed herein includes an scale, having a pouch with a fluid pressure sensor and a temperature sensor placed therein; a processing circuitry connected to the fluid pressure sensor and the temperature sensor; a communication interface connected to the processing circuitry; wherein the fluid pressure sensor is configured to determine an internal pressure from the fluid pressure sensor, and the temperature sensor is configured to determine an internal temperature within the pouch; wherein the processing circuitry is configured to calculate a weight of an object placed on the pouch based on the determined internal pressure and internal temperature; and wherein the processing circuitry is configured to relay the calculated weight of the object to a user device via the communication interface.

Certain embodiments disclosed herein also include a non-transitory computer readable medium having stored thereon instructions for causing a processing circuitry to perform a process, the process comprising: receive pressure values and temperature values; analyze the received pressure values and temperature values to determine if an equilibrium posture has been achieved, wherein the equilibrium posture is determined based on the change of pressure values over a predetermined period of time; and determine a weight based on the pressure values and temperature values.

Certain embodiments disclosed herein also include a method for measuring weight using an scale, comprising: a processing circuitry; and a memory, the memory containing instructions that, when executed by the processing circuitry, configure the system to: receive pressure values and temperature values; analyze the received pressure values and temperature values to determine if an equilibrium posture has been achieved, wherein the equilibrium posture is determined based on the change of pressure values over a predetermined period of time; and determine a weight value based on the pressure values and temperature values.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
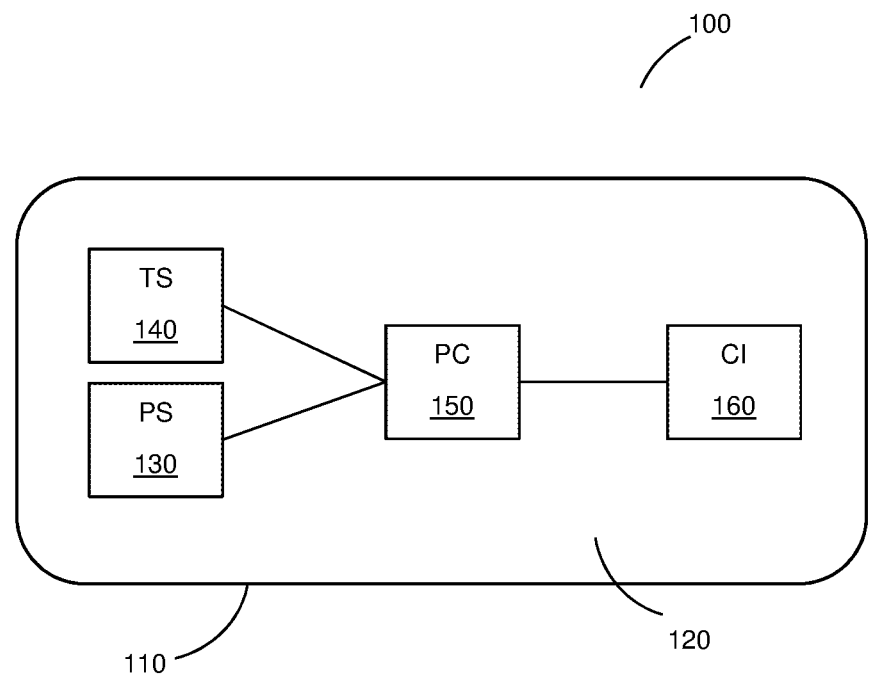
FIG. 1 is a block diagram of a scale according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a device and method for determining a weight using a pressure sensor and temperature sensor placed within a scale. The scale is configured to calculate the weight based on the internal pressure and temperature values, and is further configured to communicate data, such as the calculated weight values, to a user device via a network. The weight may be of a user or other object.

FIG. 1 is a block diagram of the scale 100 according to an embodiment. The scale 100 includes a pouch 110 having an outer wall enclosing an interior volume 120. The interior volume 120 may be filled with a fluid, e.g., a gas or a liquid, such as, but not limited to, air or an aqueous solution. In an embodiment, there may be a sealable opening (not shown), such as a valve, designed to allow access to the interior volume in order to change or replenish the contents therein. For example, if the fluid used within the interior volume 120 is air, the air may be released via the sealable opening when the scale 100 is not in use, allowing for increased portability and compactness. When using the scale 100, air may be pumped into the interior volume 120 via the sealable opening.

A pressure sensor 130 is disposed within the interior volume 120 and is connected to a processing circuitry 150. The pressure sensor 130 is configured to determine the pressure of the fluid within the interior volume 120 and relay the measured pressure to the processing circuitry 150. Further, a temperature sensor 140 is disposed within the interior volume 120 and connected to the processing circuitry 150. The temperature sensor 140 may include a thermometer, a thermocouple, an infrared sensor, and similar devices configured to measure the internal temperature of the pouch 110.

The processing circuitry 150 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The processing circuitry 150 is further connected to a communication interface 160 that is configured to relay information from the processing circuitry 150 to an external device or system, e.g., a user device (not shown) or a network (not shown). The communication interface 160 may include a wireless communication interface, such as, but not limited to, WiFi transmitter and a Bluetooth® transmitter. In a further embodiment, the communication interface 160 may be placed outside of the pouch 110 (not shown) for increased communication reliability in certain circumstances. The processing circuitry 150 may be connected to a power source (not shown), such as a rechargeable or a replaceable battery.

In an embodiment, the processing circuitry 150 is connected to a memory (not shown) that is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions cause the processing circuitry 150 to perform the various processes described herein. Specifically, the instructions, when executed, cause the processing circuitry 150 to perform a determination of an object or user's weight based on the detected internal pressure and temperature of the pouch, as discussed herein.

Figure 2A:
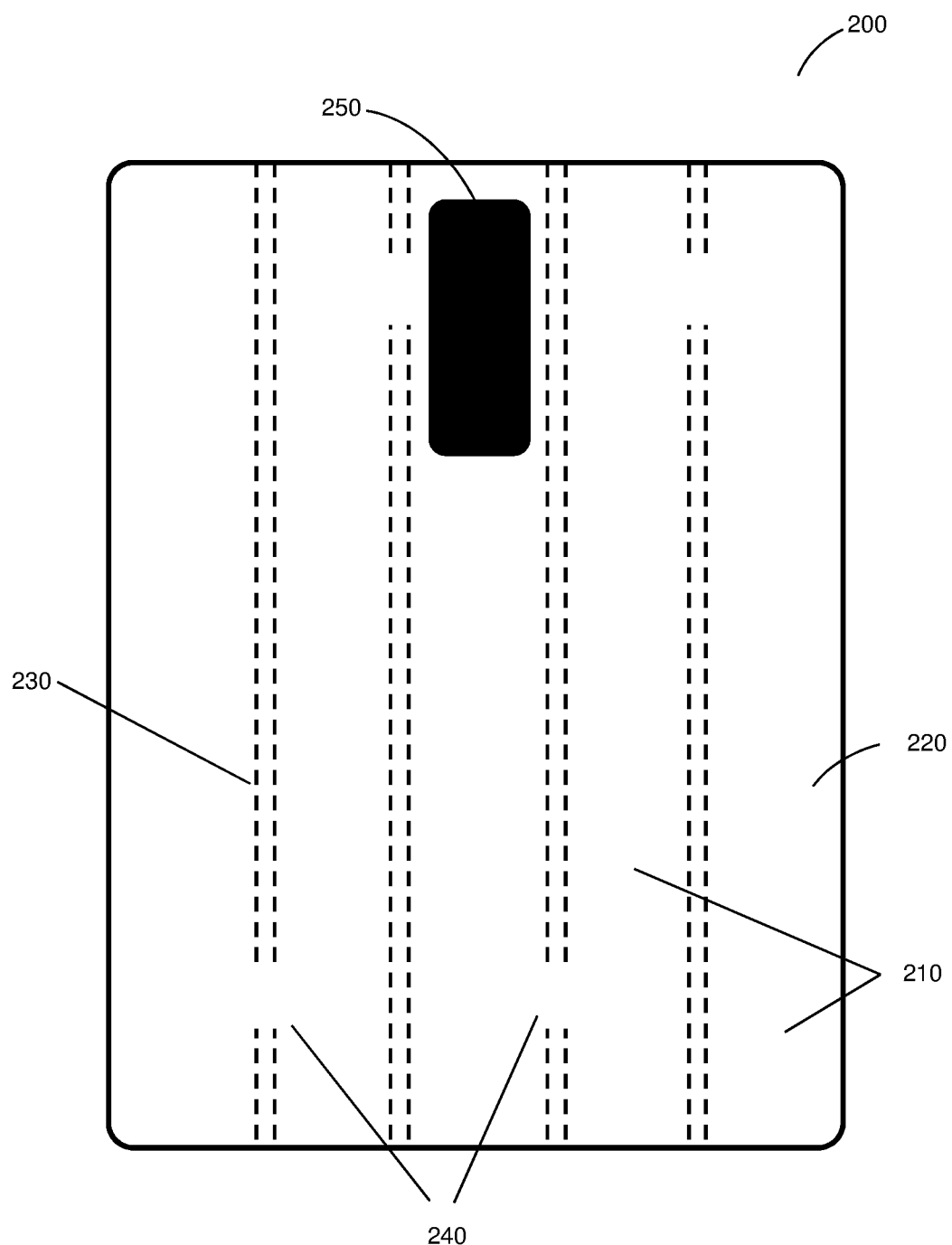
FIG. 2A is a schematic view of a scale according to an embodiment.
Figure 2B:
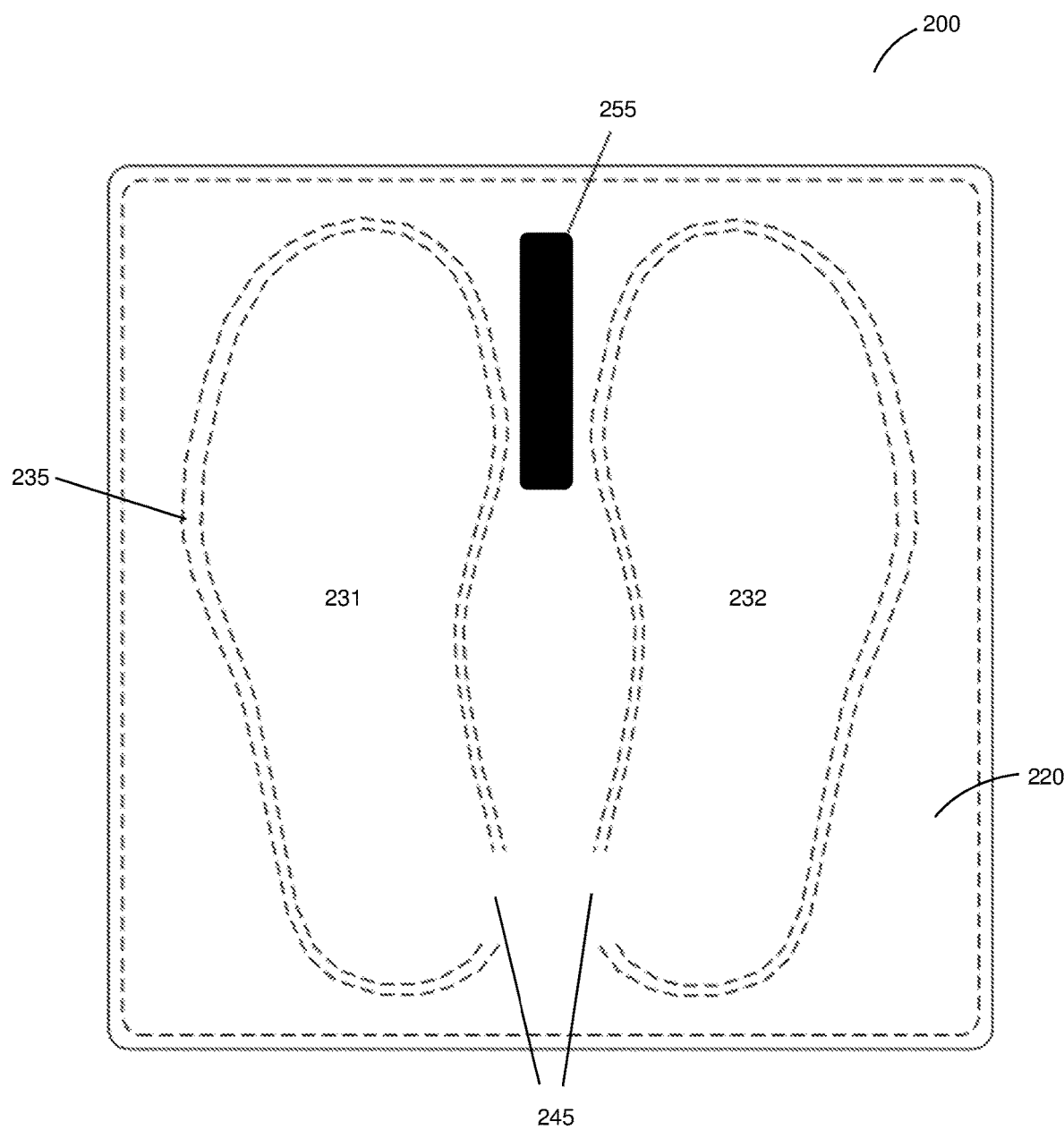
FIG. 2B is a schematic view of a scale according to an alternative embodiment.

FIGS. 2A and 2B show schematic views of two exemplary embodiments of a scale 200 according. FIG. 2A illustrates an embodiment of the scale 200, where the interior volume 220 is divided into a plurality of sections 210, wherein each section is divided from a neighboring section by a separating wall 230, and wherein each separating wall includes an opening 240, allowing fluid stored therein to flow from one section to another via the openings 240.

This structure allows for distributing the fluid within the interior volume 220 of the scale 200. By distributing the fluid within the interior volume 220, a stable surface for a user to stand on may be achieved. An enclosure 250 within the interior volume 220 may contain the processing circuitry, pressure sensor, temperature sensor, and communication interface, wherein the enclosure 250 is configured to protect elements therein from damage. However, this structure is not limited to the enclosure 250 being within the interior volume 220.

Additionally, the embodiment shown in FIG. 2A, having a plurality of parallel separating walls 230, allows for convenient folding of the scale 200 along an axis parallel to the separating walls 230. This configuration allows for compact folding, even while fluid is still present within the interior volume 220.

FIG. 2B illustrates an alternative embodiment of the scale 200, where the separating walls 235 are in the form of a sole of foot, i.e., a left foot 231 and a right foot 232, thereby a stable footing in line with their stance may be achieved. The separating walls 235 include openings 245 for internal fluid to flow therethrough. An enclosure 255 within the interior volume 220 is configured to protect elements therein from damage. However, this structure is not limited to the enclosure 255 being within the interior volume 220. In an embodiment, the shape and size of the separating walls 235 may be customized according to specific users' shoe size and weight distribution.

Figure 3:
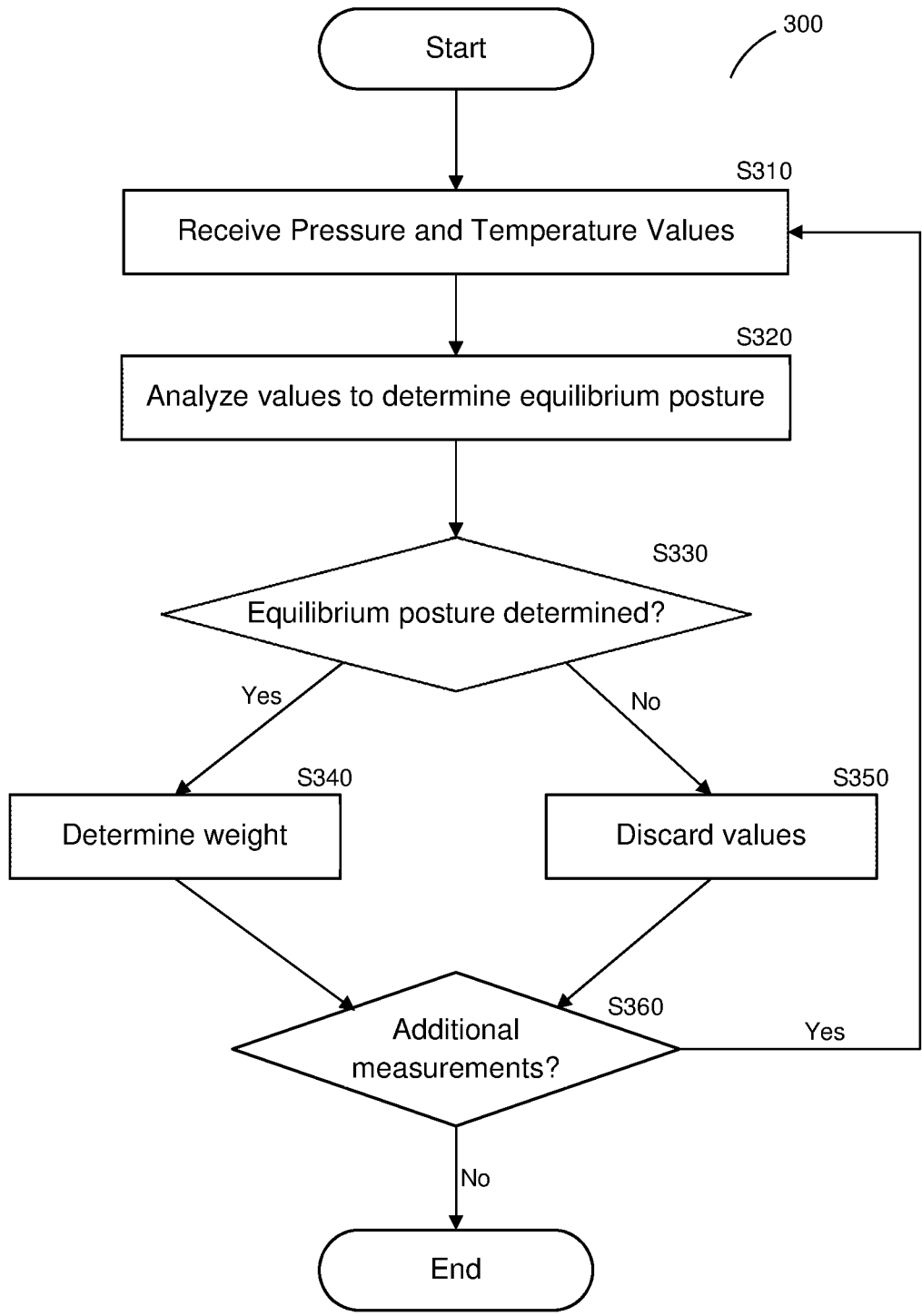
FIG. 3 is a flowchart illustrating a method for determining a weight according to an embodiment.

FIG. 3 is a flowchart illustrating a method 300 of determining a weight from a scale according to an embodiment.

At S310, pressure and temperature values are received, e.g., from a pressure sensor and a temperature sensor, respectively. In an embodiment, a predetermined amount of pressure and temperature values may be received over a set period of time. For example, 'n' samplings of the pressure and/or temperature values may be received 100 times per second, or at 100 hertz (Hz), where 'n' is an integer equal to or greater than 1. The integer 'n' may be adjusted for a higher or lower resolution of sampling data.

At S320, the received pressure and temperature values are analyzed over a period of time to determine if there is an equilibrium posture. An equilibrium posture is determined based on the following formula:

$$(P_{max}-P_{min}) < D \qquad \text{Eq. 1}$$

where $P_{max}$ is a local maximum value of pressure over a single time period, and $P_{min}$ is a local minimum value of pressure over the same time period, and D is a preset threshold.

Figure 4:
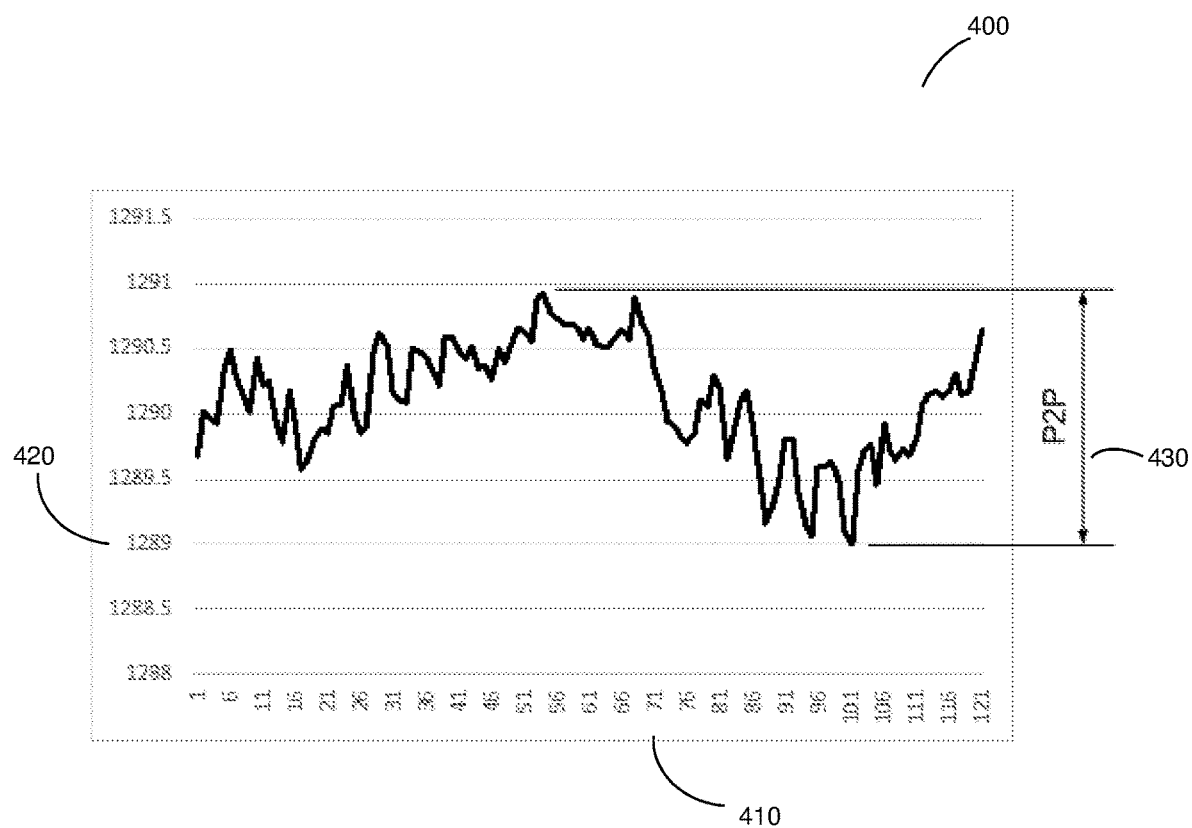
FIG. 4 is a graph illustrating a change in pressure over time as measured by a pressure sensor according to an embodiment.

Referring to FIG. 4, there is illustrated such a measurement using a graph displaying the change in pressure over time as measured by an embodiment. The measurement of internal pressure 420 is analyzed over a period of time 410. The difference between the maximum measured pressure and minimum measured pressure (P2P value) 430 is indicated.

Returning now to FIG. 3, at S330, it determined if an equilibrium posture has been detected, i.e., the P2P value 430 is compared to the predetermined value of D. If the P2P value 430 is less than D, for example over a period of 120 milliseconds, then it is determined that an equilibrium posture has been successfully detected. If so, the method continues with S340. If not, the method continues at S350. In an embodiment, D may be adjustable. Smaller values of D require less change in pressure to detect an equilibrium posture, however this may improve the accuracy of the determination of an equilibrium posture. Conversely, larger values of D will allow for the detection of an equilibrium posture with more variations in pressure measurement; however, the determination of the presence of an equilibrium posture may be less accurate. For example, in one embodiment as D values decrease accuracy may increase.

At S340, the weight of a user is determined based on the following equation:

$$W=\gamma(P_1-P_o) \quad \text{Eq. 2}$$

where W is the determined weight, $\gamma$ is a calibration constant, $P_0$ is initial internal pressure of a scale, and $P_1$ is the internal pressure after a user has placed their weight onto the scale. The constant $\gamma$ may be preset, e.g., calibrated during the manufacturing of a device. In one embodiment, the constant $\gamma$ is temperature dependent, namely the relationship between the change in pressure and the determined weight of a user must be adjusted according to a change in internal temperature. The constant $\gamma$ may be pre-programmed to be automatically adjusted according to detected temperature values. As such, the determined user weight is dependent not only on the pressure values, but on the temperature values as well.

If the internal pressures are measured in units of mbar, and the weight in Kg, then the units of the calibration constant, $\gamma$, is Kg/mbar, which has area units. Thus, $\gamma$ is the effective footprint area of the weighted object or user. The calibration constant, $\gamma$, may be determined by measuring the pressure, $P_1$, of a person with a known weight, W, using the following equation:

$$\gamma = \frac{W}{(P_1 - P_o)} \quad \text{Eq. 3}$$

At S360, it is determined if additional weight measurements are desired. If so, the process continues with S310. As a non-limiting example, in an embodiment, a minimum number of weight calculations may be set at 'X', such that a final weight value is the mean of the weight values for X calculations. Once the minimum number has been reached, no more additional measurements are deemed necessary, and the method ends.

Figure 5:
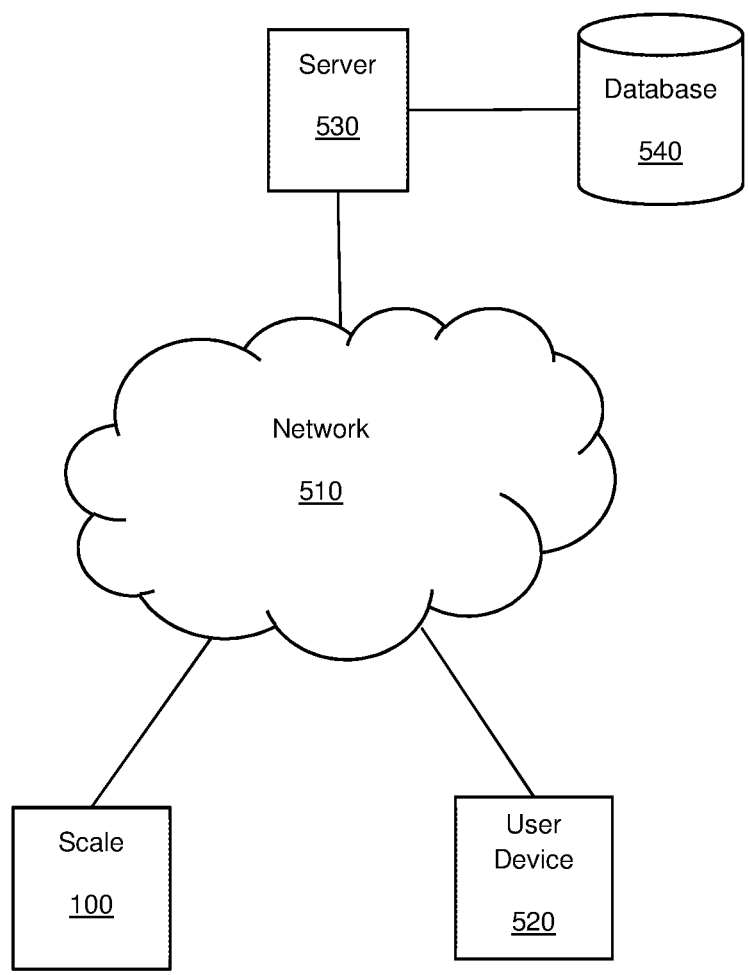
FIG. 5 is a network diagram of a system for determining a weight according to an embodiment

FIG. 5 is a network diagram of a system 500 for determining a weight according to an embodiment. The system 500 includes a network 510 which enables communication between the different elements of the system 500. The network 510 may include a local area network, e.g., via a WiFi or a Bluetooth® connection; a cellular network, e.g., the Global System for Mobile Communications (GSM) network, the Long-Term Evolution (LTE) network; and the like, that are configured to enable the transfer of data between the different elements of the system 500.

A scale 100, e.g., the scale of FIG. 1, is connected to the network 510. In an embodiment, a user device 520 may also be connected to the network 510, where the user device can be, but is not limited to, a smart phone, a mobile phone, a laptop, a tablet computer, a wearable computing device, and the like. Data can be sent from the scale 100 to the user device 520 via the network 510. For example, calculated weight values measured on the scale 100 may be sent over a connection to a user device 520. For example, the connection may be wireless.

In an embodiment, the data includes feedback that may be provided to a user based on the user's preferences and/or goals. For example, if a user is concerned with losing weight, the scale 100 may provide weight measurements, present trends/changes in body weight, and provide the user with suggestions relating to the user's situation and status based on the measures taken. In an embodiment, the data gathered may be presented in real time to a trainer of the user as well, who will be able to follow-up and provide direct feedback and support. The user will also be able to share the information in a social group for receiving feedback from various connections.

The collected data is received by a user device. The data may include the calculated weight of the user. A data analysis is performed on the data. In an embodiment, the data analysis is performed by the server 530. The data analysis is performed to provide real-time feedback to the user based on the collected data, previously stored data associated with the user, and the user's personal information (e.g., age, current weight, height, and so on). Based on the analysis, feedback is generated for the user. Feedback may include, distance required to burn a certain number of calories, the current weight loss or gain trend, days to accomplish weight goal based on the user's trend, and the like. The generated feedback may be transmitted to an application on the user device 520 to be displayed to the user. The data and feedback may be stored in a database, e.g., database 540, for use in future data analysis.

In an embodiment, the system 500 further includes a server 530 and a database 540. The database 540 is configured to store therein information (e.g., calculated weight based on detected pressure and temperature values) associated with the scale 100. The database 540 may be connected to the network 510 via the server 530, or connected directly to the network 510 (not shown). The server 530 is configured to access the database 540 in order to store and compare calculated weight values accessed from multiple scales.

In an embodiment, the user device 520 is configured to access historical weight data from the database 540 via the network 510. The historical weight data may include data related to that particular user, or data related to other users having similar physical characteristics, e.g., age, height, health status, and the like. This allows a comparison of current weight measurements to prior data in order to view weight trends of themselves or others. In another embodiment recommendations or nutritional information may be provided to a user in addition to historical weight data.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A scale, comprising:
    a pouch having a fluid pressure sensor and a temperature sensor placed therein;
    a processing circuitry connected to the fluid pressure sensor and the temperature sensor;
    a communication interface connected to the processing circuitry;
    wherein the fluid pressure sensor is configured to determine an internal pressure within the pouch, and the temperature sensor is configured to determine an internal temperature within the pouch;
    wherein the processing circuitry is configured to calculate a weight of an object placed on the pouch based on the determined internal pressure and internal temperature; and
    wherein the processing circuitry is configured to relay the calculated weight of the object to a user device via the communication interface.

2. The scale of claim 1, wherein the pouch is filled with a fluid.

3. The scale of claim 2, wherein the fluid comprises at least one of: a gas and a liquid.

4. The scale of claim 1, wherein the communication interface includes at least one of: a WiFi interface and a Bluetooth interface.

5. The scale of claim 1, wherein the pouch further comprises:
    a plurality of internal sections, wherein each of the plurality of internal sections is divided from a neighboring internal section by a separating wall; and
    an opening disposed within each separating wall, allowing a fluid to flow from a first section to a neighboring second section.

6. The scale of claim 5, wherein each of the plurality of internal sections are parallel to one another.

7. The scale of claim 5, where the plurality of internal section are in the form of a sole of a foot.

* * * * *